Jan. 18, 1944.  E. C. HORTON ET AL  2,339,407
CONTROL MEANS FOR WINDSHIELD CLEANERS
Filed July 18, 1941
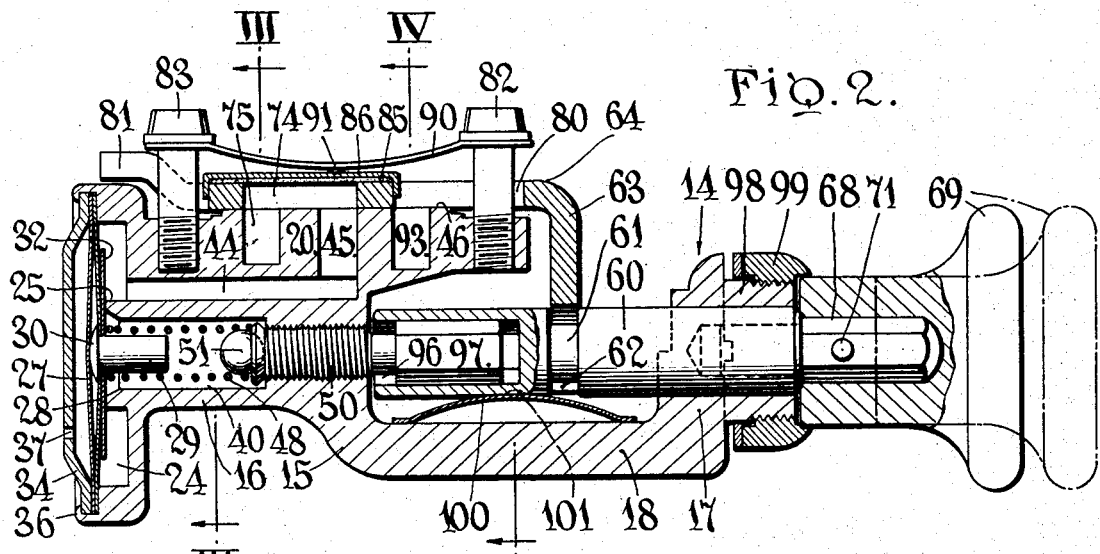
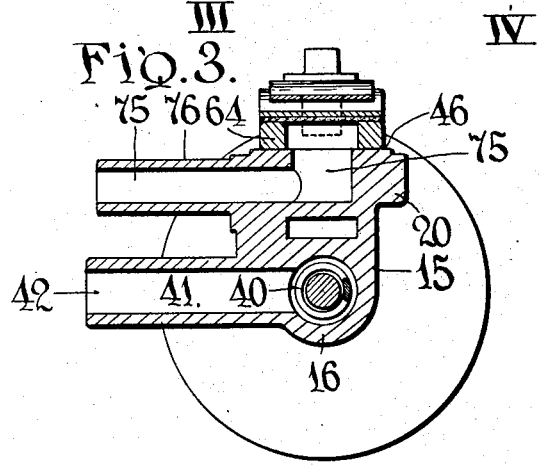
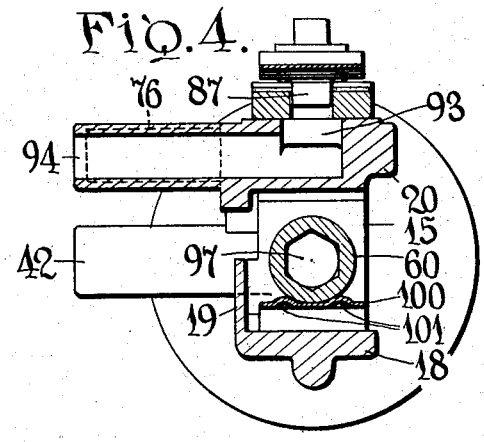
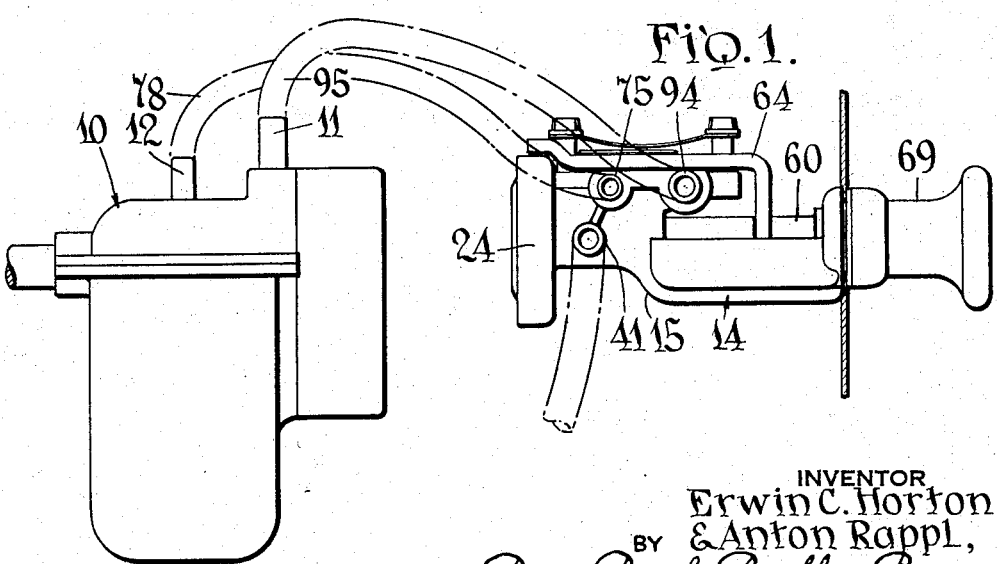
INVENTOR
Erwin C. Horton
& Anton Rappl,
BY Beau, Brooks, Buckley & Beau.
ATTORNEYS Patented Jan. 18, 1944

2,339,407

UNITED STATES PATENT OFFICE 2,339,407

CONTROL MEANS FOR WINDSHIELD CLEANERS

Erwin C. Horton, Hamburg, and Anton Rappl, Buffalo, N. Y., assignors to Trico Products Corporation, Buffalo, N. Y.

Application July 18, 1941, Serial No. 403,057

8 Claims. (Cl. 137—144)

This invention relates to an automatic windshield cleaning mechanism for vehicles and primarily to improved control means for the cleaner actuating motor thereof.

In current automotive practice automatic windshield cleaners are incorporated with the body structures of the vehicles they serve in such manner as to render their actuating motors not readily accessible and certain problems are presented in regulating their operating speeds as well as in rendering them selectively operative and inoperative. The problem is aggravated by the fact that such windshield cleaner motors are located at points relatively remote from the position of the operator of the vehicle.

By our present invention we provide a unitary self-contained control means which may be disposed remotely from the windshield cleaner motor, having connection therewith merely by a pair of fluid conduits. An object of the present invention is to provide full remote control means, both as to condition of operativeness and as to speed, without the necessity for any mechanical connection between the control means and the windshield cleaner motor served thereby.

According to the present invention all of the valve means involved in the manual starting or stopping of the cleaner operation and all of the valve means employed in automatically and selectively controlling the operating speed thereof is in close proximity to and in fact directly movable by the manual manipulating element handled by the operator. This does away with extensive mechanical linkages, flexible cables, wires and chains, and like prior art attempts to effectuate adequate windshield cleaner control by remote mechanical connection.

A single embodiment of the invention is illustrated in the accompanying drawing and described in detail below. It is to be understood, however, that the illustrated form is set forth by way of example only and the spirit and scope of the invention is not to be considered as limited to the particular form shown or otherwise than as defined in the appended claims.

In the drawing:

Fig. 1 is a general elevational view of a windshield cleaner actuating motor of the vacuum operated type in association with the novel remote control means of the present invention in an illustrative form;

Fig. 2 is an enlarged longitudinal cross sectional view of the control means viewed as in Fig. 1;

Fig. 3 is a transverse cross sectional view taken on the line III—III of Fig. 2; and, Fig. 4 is a transverse cross sectional view taken on the line IV—IV of Fig. 2.

Throughout the several figures of the drawing like characters of reference denote like parts and the numeral 10 designates generally a windshield cleaner actuating motor which may be of the type embodying selectively connectible fluid pressure ports for normal operation of the motor and for retaining the same in a predetermined parked position. Such connections are designated 11 and 12, respectively, in Fig. 1. Detailed construction of a motor of this type is not necessary to be set forth herein and for such details reference may be had to United States Letters Patent No. 2,209,921, issued to Erwin C. Horton, one of the inventors herein, and dated July 30, 1940.

The novel control means is designated generally 14 in Fig. 1 and, referring to Fig. 2 particularly, comprises generally a unitary body 15 having spaced coaxial bearing portions 16 and 17, respectively. The bearing portions 16 and 17 are rigidly connected by a portion 18 of the body 15 and a portion of the mechanism is partially enclosed by a wall 19 which extends along a marginal edge of the portion 18.

Adjacent the bearing portion 16 of the body 15 there is preferably provided an extension 20 arranged to accommodate various fluid pressure passages which will presently be described in detail. The remote control means of the present invention is arranged to accomplish two desired results. One of these results is the manual control of the motor 10 for starting and stopping the same at will. The other of these results is effective speed control of the wiper when the latter is in operation. Such speed control is rendered desirable by virtue of the fact that conventional sources of fluid differential pressure, either in the form of intake manifold connections or of engine operated fluid pressure pumps, are variable by nature.

The means for controlling the effective degree of fluid differential pressure will first be described. For the accomplishment of this object of the invention the outer end of the body 15 adjacent the bearing portion 16 is enlarged to provide an annular valve chamber 24 which has therein a valve seat 25 which is preferably formed coaxially with the bearing portion 16. The valve chamber 24 is provided with a movable wall comprising a pair of flexible plates 27 and 28. The plate 28 has a central opening for receiving the shank 29 of a headed element whose head 30 is retained between the plates 27 and 28. A valve disc 32 is likewise carried by the shank 29 of the headed element and, as shown in Fig. 2, is bearing against the valve seat 25.

The movable wall plates 27 and 28 are retained in an annular seat formed in the annular valve chamber 24, along with a cover member 34, as by peening over the outer rim of the enlargement forming the valve chamber 24, see 36 in Fig. 2. The cover member 34 is provided with one or more apertures as at 37, whereby the left-hand side of the movable wall 27, 28 is subject to pressure of the atmosphere.

The valve seat 25 has a coaxial fluid passage 40 which terminates in a laterally extending fluid passage 41, see Fig. 3. The passage 41 extends outwardly through a nipple 42 which may be connected to any desired source of fluid differential pressure. In the particular form described here by way of example, subatmospheric fluid pressure is in contemplation.

The fluid passages 41, 40 continue past the valve seat 25 and the valve 32 in a fluid passage 44 formed in the body 15 and the passage 44 terminates in a port 45 which emerges at a flat valve seating face 46 formed on the extension 20 of the body element 15.

While the valve 32 is shown in the drawing as seated against the valve seat 25, such valve will, in normal operation, be biased to open position by means of a compression coil spring 48 acting thereagainst. The coil spring seats at its other end against the end of a threaded element 50 in cooperation with a ball 51 which is pressed into the adjacent end of the spring 48 for centering the same.

Beginning with the valve 32 in an open position, it will be noted that increases in the degree of evacuation of the valve chamber 24 will result in partial closing movement of the valve 32 under the influence of atmospheric pressure acting against the outside of the plate 27. Such closing movement will be in proportion to the degree of evacuation and the subatmospheric fluid passage 41, 40, 44 will accordingly be restricted in like degree with the result that a substantially uniform degree of subatmospheric pressure will be presented at the port 45.

Reference will now be had to the means provided for manually diverting such controlled subatmospheric pressure to cause the cleaner motor either to be operative or to be held in parked position. The bearing portion 17 of the body 15 receives, for rotary and axial sliding movement, a stem 60 which has an annular groove 61 adapted to receive the bifurcated end 62 of a downward extension 63 formed on a flat distributing valve 64 which seats against the valve face 46. The stem 60 has an extension 68, preferably noncircular, for receiving a manual control knob 69 which may be secured thereto as by a transverse pin 71.

The valve 64 has an elongate bridging passage 74 which, in the position illustrated in Fig. 2, is shown to connect the subatmospheric port 45 with a port 75 formed in the body 15 and extending laterally through a nipple 76, see Fig. 3. The nipple 76 is intended to be connected to the parking port 12 of the windshield cleaner motor 10 as by a conduit 78, Fig. 1.

The flat valve 64 is arranged to be moved lengthwise along the valve face 46 of the body member 15 and to this end is provided with an elongate slot 80 and a bifurcation 81 at its end. A pair of screws 82 and 83 are threaded into the extension 20 of the body member 15 and extend through the slot 80 and the bifurcation 81, respectively, to guide the valve 64 in its lengthwise movement.

The passage 74 of the valve 64 is closed at the top of the valve 64 by a flat sheet 85 which in the exemplary form may be a sheet of paper or other suitable packing material. The sheet 85 is held in place and backed by a plate member 86 which may be of metal and has a pair of ears 87 which may be struck from its ends and which engage respectively in the bifurcation 81 and the slot 80 to prevent displacement of either the plate member 86 or the sheet 85 which is retained thereby.

The packing sheet 85 and the plate member 86 are held securely against the top of the valve 64 and the valve itself is retained resiliently against its seat 46 by means of a leaf spring 90 whose ends are preferably bifurcated to engage beneath the heads of the screws 82 and 83, respectively. The intermediate portion of the leaf spring 90 is bowed to engage the top of the plate member 86 and embossed protuberances may be formed in such bowed portion as at 91 for reducing friction and for insuring balanced application of spring pressure against the upper side of the plate member 86 despite variations in accuracy of manufacture of the several component parts.

A third fluid port 93 leads from the valve seat face 46 of the body member 15 and has a lateral extension through a nipple 94 which is adapted to be connected to the operating connection 11 of the windshield cleaner motor 10 as by means of a flexible conduit 95.

It will be apparent from the foregoing that withdrawal of the knob 69 to the dotted position of Fig. 2 will move the valve 64 to the right as seen in that figure and place the port 74 of the valve 64 in position for connecting the differential fluid pressure supply port 45 with the port 93 which leads ultimately to the operating connection 11 of the motor 10. Such axial movement of the knob 69 and the stem 60 is arranged to be accomplished without interference with the adjustment of the pressure control means. To this end the stem 60 terminates in a non-circular axial opening 96 which receives, for free axial sliding movement, a similarly shaped head portion 97 formed on the screw 50 of the fluid pressure control means.

It will likewise be seen from the foregoing that rotation of the knob 69, regardless of its axial disposition, will transmit rotary adjusting movement to the screw 50 without, in turn, interfering with the axial disposition of the knob 69, the stem 60 or the valve 64, all by virtue of the yoke connection of the valve 64 with the annular groove 61 of the stem 60 through the medium of the bifurcation 62.

For convenient attachment of the control device to a position of ready accessibility the bearing portion 17 of the body member 15 may be provided with a reduced threaded extension 98 which may be extended through an opening formed in a vertical instrument panel or the like and secured therein by means of a nut 99.

It will be noted from Figs. 2 and 4 that in the illustrated form a curved leaf spring 100 is disposed against the connecting portion 18 of the body member 15 with its bowed medial portion bearing against the periphery of the stem 60. This spring pressure serves to frictionally retain the stem 60 in any given position of adjustment axially or angularly. To facilitate introduction of the spring 100 and to insure proper centering and ready retention thereof in assembled position a pair of spaced protuberances 101 are formed thereon and cooperate to provide, in effect, a depression therebetween for receiving the lower periphery of the stem 60.

What is claimed is:

1. Fluid pressure control means comprising a unitary body member having a pair of spaced coaxial bearings and a valve-seating face disposed parallel to said axis, a fluid pressure passage in communication with said valve-seating face, a pair of other fluid pressure passages likewise in communication with the valve-seating face, a valve positioned against said face for guided movement in the direction of said axis, a rotatable and axially movable manual control element journaled in one of said bearings and having an annular groove between said bearings, a unitary extension of said valve comprising a bifurcation for engagement in said groove whereby axial movement of said stem effects movement of said valve on said valve-seating face to selectively connect said first mentioned fluid pressure passage to either of said other passages, pressure regulating means for said first-mentioned fluid pressure passage associated with said other bearing and comprising a member rotatable in said other bearing for effecting adjustment of said regulating means, and means connecting said manual control element with said rotatable adjusting member for joint rotary and relative axial movement.

2. Unitary fluid pressure control means comprising a body member having a fluid passage therein provided with pressure responsive means for controlling the degree of fluid pressure transmitted by said passage, said passage communicating with a flat valve-seating face provided on said body member and a pair of other fluid passages likewise in communication with said flat valve seating face, rotary means for regulating said pressure responsive means, an outboard bearing formed unitarily with said body member, said bearing being coaxial with said rotary means, a valve seated against said valve-seating face for sliding movement in the direction of the axis of said bearing and said rotary means and a passage in said valve for selectively diverting the pressure of said first mentioned fluid passage to either of said other passages, and a manual manipulating element journaled in said bearing for rotary and axial movement and having connection with said rotary means and said valve for respectively regulating said pressure responsive means and effecting connection thereof with either of said other passages.

3. A dual control for fluid actuated devices, comprising a body having a side face with a pressure supply port and a pair of other ports opening therethrough, a valve slidable on the face to selectively connect the supply port to either of said other ports, said body also having another face through which a pressure supply passage opens over a seat into a second passage communicating with the supply port, a throttling member movable toward and from the seat to vary the capacity of the supply passage, resilient means acting to urge the throttling member in one position against the action of the fluid pressure in the passage, means for adjusting the urge of said resilient means, and a common operator for said adjusting means and said valve permitting independent regulation of each, said body having a projecting mounting portion providing a bearing for the common operator opposed to the main body part and separated therefrom by an intervening space in which the common operator is connected to both the adjusting means and the valve.

4. A control unit comprising a body having a fluid passage, regulating means operable for adjusting the capacity of the fluid passage and including a rotatable adjusting part journaled in one portion of the body, power shut-off means operable for interrupting the flow of fluid through the fluid passage and including a reciprocable actuating part slidable as well as journaled in another portion of the body spaced from the first portion, said slidable actuating part being disposed substantially on the axis of the rotatable adjusting part, and both of said mounting body portions being joined by a connecting portion offset from such axis, said slidable actuating part extending from its mounting body portion into the space between both mounting body portions and slidably keyed to the first actuating part for imparting rotary movement to the latter whereby the rotatable adjusting part provides support for the slidable actuating part during sliding movement of the latter.

5. A control unit comprising a body having a fluid passage, regulating means operable for adjusting the capacity of the fluid passage and including a rotatable adjusting part journaled in one portion of the body, power shut-off means operable for interrupting the flow of fluid through the fluid passage and including a reciprocable actuating part slidable as well as journaled in another portion of the body spaced from the first portion, said slidable actuating part being disposed substantially on the axis of the rotatable adjusting part, and both of said mounting body portions being joined by a connecting portion offset from such axis, said slidable actuating part extending from its mounting body portion into the space between both mounting body portions and slidably keyed to the first actuating part for imparting rotary movement to the latter whereby the rotatable adjusting part provides support for the slidable actuating part during sliding movement of the latter, said power shut-off means including a slide valve having a portion projecting into the space between the mounting body portions for engagement with said reciprocable and slidable part for actuation thereby.

6. A control unit comprising a body having a fluid passage, regulating means operable for adjusting the capacity of the fluid passage and including a rotatable adjusting part journaled in one portion of the body, power shut-off means operable for interrupting the flow of fluid through the fluid passage and including a reciprocable actuating part slidable as well as journaled in another portion of the body spaced from the first portion, said slidable actuating part being disposed substantially on the axis of the rotatable adjusting part, and both of said mounting body portions being joined by a connecting portion offset from such axis, said slidable actuating part extending from its mounting body portion into the space between both mounting body portions and slidably keyed to the first actuating part for imparting rotary movement to the latter, and spring means supported by said connecting portion and bearing against said reciprocable and slidable part to frictionally detain both it and the rotatable adjusting part in adjusted position.

7. Unitary fluid pressure control means comprising a body member having a fluid passage therein provided with pressure responsive means for controlling the degree of fluid pressure transmitted by said passage, said passage communicating with a flat valve-seating face provided on said body member and a pair of other fluid passages likewise in communication with said flat valve seating face, rotary means for regulating said pressure responsive means, an outboard bearing formed unitarily with said body member, said bearing being coaxial with said rotary means, a valve seated against said valve-seating face for sliding movement in the direction of the axis of said bearing and said rotary means and a passage in said valve for selectively diverting the pressure of said first mentioned fluid passage to either of said other passages, a manual manipulating element journaled in said bearing for rotary and axial movement and having connection with said rotary means and said valve for respectively regulating said pressure responsive means and effecting connection thereof with either of said other passages, and spring means supported by said body member between the body proper and said outboard bearing and bearing radially against said manipulating element to detain the same against inadvertent rotary or axial movement.

8. A dual control for fluid actuated devices, comprising a body having a side face with a pressure supply port and a pair of other ports opening therethrough, a valve slidable on the face to selectively connect the supply port to either of said other ports, said body also having another face through which a pressure supply passage opens over a seat into a second passage communicating with the supply port, a throttling member movable toward and from the seat to vary the capacity of the supply passage, resilient means acting to urge the throttling member in one position against the action of the fluid pressure in the passage, means for adjusting the urge of said resilient means, and a common operator for said adjusting means and said valve permitting independent regulation of each, said body having a projecting mounting portion providing a bearing for the common operator opposed to the main body part and separated therefrom by an intervening space in which the common operator is connected to both the adjusting means and the valve, said mounting portion comprising a threaded projection for insertion through an opening in a mounting panel and a nut for engagement with said threads to maintain the body rigid with respect to the panel.

ERWIN C. HORTON.
ANTON RAPPL.